United States Patent [19]
Fanning et al.

[11] Patent Number: 5,186,411
[45] Date of Patent: Feb. 16, 1993

[54] SPOOL WITH HOLDER

[75] Inventors: Desmond G. Fanning, Balwyn; Nicholas J. Booth, Tecoma, both of Australia

[73] Assignee: Peter Fanning and Company Proprietary Limited, Melbourne, Australia

[21] Appl. No.: 720,776
[22] PCT Filed: Jan. 16, 1990
[86] PCT No.: PCT/AU90/00012
    § 371 Date: Jul. 15, 1991
    § 102(e) Date: Jul. 15, 1991
[87] PCT Pub. No.: WO90/08090
    PCT Pub. Date: Jul. 26, 1990

[30] Foreign Application Priority Data
    Jan. 17, 1989 [AU] Australia ............ PJ2304

[51] Int. Cl.⁵ .................. B65H 75/40; B65H 75/44
[52] U.S. Cl. ................................................ 242/96
[58] Field of Search ............ 242/96, 99, 85, 100

[56] References Cited
U.S. PATENT DOCUMENTS

| | | | |
|---|---|---|---|
| 58,378 | 10/1866 | Chamberlain | 242/96 |
| 1,455,343 | 5/1923 | Leber | 242/96 |
| 1,944,669 | 1/1934 | Purdy | 242/96 |
| 2,047,705 | 7/1936 | Porter | 242/99 |
| 2,434,479 | 1/1948 | Allen | 242/96 |
| 2,479,946 | 8/1949 | Lofgren | 242/96 |
| 2,753,131 | 7/1956 | Erdman | 242/96 |
| 2,757,881 | 8/1956 | Halsey | 242/99 |
| 2,855,717 | 10/1958 | Heil | 242/96 X |
| 4,195,794 | 4/1980 | Ricci et al. | 242/96 |

FOREIGN PATENT DOCUMENTS

| | | |
|---|---|---|
| 5992 | 1/1952 | Australia . |
| 157515 | 11/1952 | Australia . |
| 229025 | 11/1958 | Australia . |
| 31774 | 12/1977 | Australia . |
| 69615 | 3/1987 | Australia . |

Primary Examiner—Stanley N. Gilreath
Attorney, Agent, or Firm—Hovey, Williams, Timmons & Collins

[57] ABSTRACT

A spool and holder assembly suitable for use as a hand fishing reel are provided wherein the holder (7) has an axle (9) held within an axial bore (6) of the spool by integral stop means (12) on the holder (7) which prevents the holder (7) from passing completely through the spool and further integral means (10) at the free end of the axle (9) which interact with the axial bore (6). Winding means (14) may also be provided which may include a retractable handle (15) retained in a bore (21) in the spool parallel with the axial bore (6).

6 Claims, 1 Drawing Sheet

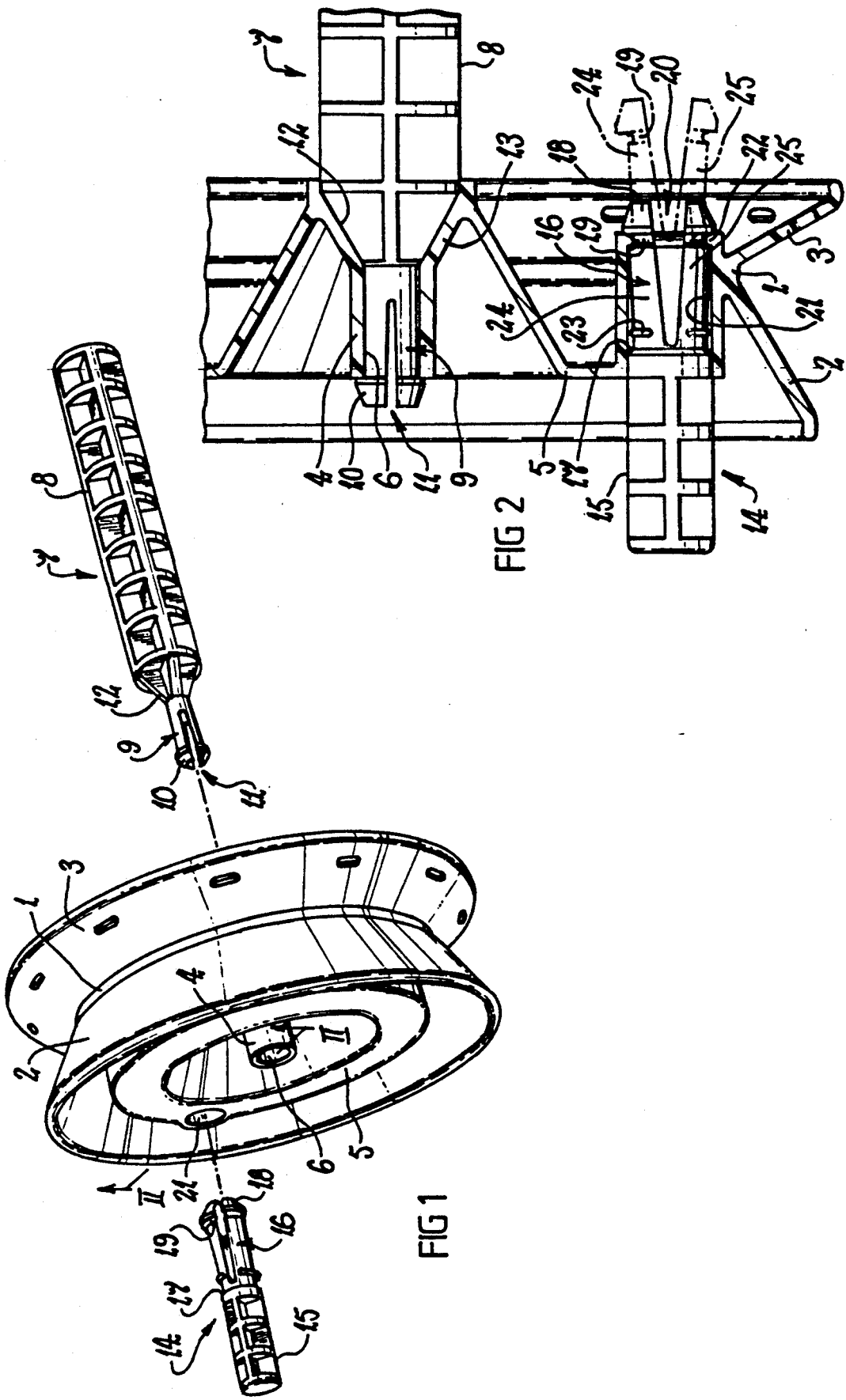

SPOOL WITH HOLDER

BACKGROUND OF THE INVENTION

1. Field of the Invention

This invention relates to a spool which rotates upon a holding means and which may be used to store, pay out or rewind line or thread retained on the spool.

2. Discussion of the Prior Art

It is well known to store large quantities of line, thread or similar material (hereinafter referred to as "line"), when not in use, upon a spool. Such spools typically have a cylindrical rim, about the circumference of which the line is wound, with a flange projecting radially outward from each edge of the rim to prevent the line from sliding off the edges of the rim. In some applications, such as hand-fishing reels, the flanges are not identical; one flange being adapted to allow line to be removed from the spool without rotation of the spool. This is done by drawing a free end of the line away from the spool, parallel to the axis of the spool, thus drawing the line over one flange and unwinding it from the spool. This flange, (hereinafter referred to as the "line-side flange") is usually adapted by reducing the diameter of the line-side flange relative to the other flange and by angling the line-side flange axially away from the rim of the spool. The other flange may also be angled away from the rim, though to a lesser extent than the line-side flange to assist in guiding line being rewound onto the spool.

The interior of the spool may be left open or may be provided with spokes or a solid web radiating from a hub. It is usual to provide an axial bore in the hub so that a shaft may be inserted to assist in handling the spool. This is mainly useful when the spool is rotated about its axis to pay out line. Several problems arise, however, in that the spool is not retained upon the shaft and may consequently fall or be pulled off. Further, if it is desired to pay out line quickly by feeding it over the line-side flange as described above, a shaft projecting from the axis of the spool may foul and entangle the line. It is not easy to change from paying out the line of the spool over the flange to paying the line off the rotating spool. Also, spools are not especially well adapted to assist in drawing line in, the presence of spokes which enable the user to grip the spool being the usual aid provided.

OBJECTS AND SUMMARY OF THE INVENTION

An object of the present invention is to provide a spool which is retained upon a holding means, so that it can rotate freely upon the holding means, but in which the holding means will not foul a line which is drawn from the spool over a flange and in a direction substantially parallel to the axis of the spool. A further object of the invention is to provide winding means to assist in the paying out or drawing in of line, also without fouling a line paid out over the flange of the spool.

Accordingly, the present invention provides a spool and a holder including a spool having a line side and an opposite holder side, and being provided with a cylindrical rim, radially outwardly extending holder-side and line-side flanges at each side of the spool, and a hub connected to the rim and having an axial bore. A holding means is provided including a grip portion and an axle portion, the axle portion extending into the axial bore so that the spool is rotatably mounted on the holding means. An integral stop means on the holding means located between the grip portion and the axle portion prevents the holding means from passing through the axial bore beyond a position at which the stop means abuts the spool. The holding means does not project axially substantially beyond the line-side flange. Integral retention means are provided on the axle portion and interact with the axial bore for retaining the spool on the holding means.

A winding means is provided which includes a winding bore extending through the spool parallel to the axial bore and situated between the axial bore and the radially outermost portion of either flange. The winding means also includes a winding handle removably insertable into the winding bore through the line side of the spool. The winding handle includes a substantially cylindrical hand-hold portion of a diameter forming a close sliding fit within the winding bore and which merges through an intermediate shoulder with a shaft portion of slightly lesser diameter, whereby the winding handle is axially movable within the winding bore between an extended or winding position in which the hand-hold portion of the winding handle projects from the line-side of the spool, and a retracted position in which the hand-hold portion is retained substantially within the winding bore.

BRIEF DESCRIPTION OF THE DRAWING FIGURES

To assist a further understanding of the invention, reference is now made to the accompanying drawings. These drawings show a preferred embodiment only and are not to be taken as limiting the scope of the invention as described above. In these drawings:

FIG. 1 is an exploded perspective view of a spool and holder in accordance with the invention, FIG. 2 is a cross-section view of part of the spool and holder of FIG. 1, taken on the line II—II.

DETAILED DESCRIPTION OF A PREFERRED EMBODIMENT

A spool in accordance with the invention has a line side and an opposite side (hereinafter referred to as the "holder side") and comprises a cylindrical rim having a radially outwardly extending flange at each side of the spool. The spool further includes a hub having an axial bore. The line-side flange preferably has a relatively smaller diameter than the holder-side flange and is preferably angled axially away from the rim. The holder-side flange preferably has a relatively large diameter and is preferably less obtusely angled away from the rim than the flange on the line-side.

In accordance with the invention, the spool is rotatably mounted upon a holding means comprising a grip portion and an axle portion. The axle portion is passed through the axial bore of the hub until the spool abuts an integral stop means forming part of the holding means between the grip portion and the axle portion. The axle portion also includes integral retention means which interacts with the axial bore to retain the spool upon the holding means, so that the grip portion of the holding means projects axially beyond the holding-side flange but the holding means does not project axially substantially beyond the line-side flange.

The holding means is preferably of cylindrical or substantially cylindrical rod-like form. The grip portion may be adapted for manipulation by providing ridges, indentations or the like to assist in obtaining a firm grip.

The axle portion is preferably a smooth cylinder to allow for easy rotation within the axial bore of the hub and has a diameter less than that of the axial bore. The stop means may be any suitable means which prevents the spool from leaving the axle portion of the holding means and moving onto the grip means. For example, the stop means may be a flange encircling the holding means at the junction of the grip and axle portions. It is preferred to make the grip portion of larger diameter than the axial bore so that the stop means is a shoulder formed between the grip and axle portions of the holding means.

In a preferred embodiment the free end portion of the axle portion is formed as a frusto-conical boss. The boss tapers radially inwardly to the free end of the axle portion and forms a shoulder where it merges with the remainder of the axle portion. The taper assists in inserting the axle portion into the axial bore. The maximum diameter of the frusto-conical boss is greater than that of the axial bore, so that to allow for insertion and withdrawal through the axial bore, at least one diametrical slot is provided passing from the narrowest end of the frusto-conical boss through the wider end and at least part way through the axle portion. The diametrical slot or slots thereby define a plurality of legs which may be resiliently forced towards each other, thus effectively reducing the diameter of the frusto-conical boss to a diameter at which it can pass through the axial bore. When the boss has passed through the bore, the legs resiliently return to their original positions, increasing the effective diameter of the frusto-conical boss and preventing withdrawal of the axle portion from the axial bore. When the legs are again forced towards each other, the holding means can readily be removed from the spool.

In a further preferred embodiment, the spool includes fastening means, whereby the holding means can be fastened to the spool for storage. The fastening means may include at least one attached or integral clip member adapted to releasably fasten the holding means to the spool. Preferably, the clip member is located to allow the holding means to be fastened so as to lie substantially parallel with the holding side of the spool.

The spool also preferably includes winding means which will not foul a line paid out over the line-side flange during removal of the line from the spool.

In one embodiment, the winding means consists of a winding bore extending into and in the preferred embodiment, through the spool, parallel to the axial bore and situated between the axial bore and the outermost portion of either flange, preferably between the axial bore and the circumference of the rim. The user can insert a finger into the winding bore from the line side and use it to assist in rotating the spool upon the holding means. Preferably, to avoid possible injury to the finger of the user, a winding handle is inserted into the winding bore from the line side. The spool may then be turned using this handle.

If a winding handle is provided, it is preferably removable to avoid the handle fouling the line. Alternatively, or according to a preferred embodiment of the invention additionally, a retractable winding handle is provided which can be moved axially into and out of the winding bore. Preferably, the retractable winding handle consists of a substantially cylindrical hand-hold portion of a diameter forming a close sliding fit within the winding bore and a substantially cylindrical shaft portion of slightly lesser diameter to the hand hold-portion. One end of the shaft portion merges with an intermediate shoulder separating the shaft portion from the hand-hold portion; the free end portion of the shaft portion is formed as a frusto-conical boss. The boss forms a shoulder where it merges with the remainder of the shaft portion and tapers radially inwardly to the free end of the shaft portion.

The retractable winding handle is preferably retained partly within the winding bore in both extended and retracted positions of the handle. To enable retention of the handle, a circumferential groove may surround the shaft portion of the handle immediately adjacent to the frusto-conical boss for cooperation with a circumferential rib in the winding bore. The groove and rib are complementary in form and are located so that in the extended position of the handle, the rib rests in the groove thus holding the handle in this position while still allowing it to rotate in the winding bore. The groove preferably has a substantially radially extending wall adjacent to the frusto-conical shoulder and a sloping opposite wall.

The shaft portion of the retractable winding handle has at least one diametrical slot extending from the free end of the shaft portion to the intermediate shoulder, thus defining a plurality of legs. The legs comprising the shaft may be spread apart so that the diameter of the shaft increases slightly towards the free end of the legs. The winding bore has a circumferential internal rib which projects radially inwardly at the end of the winding bore adjacent to the holder-side of the spool.

The dimensions of the winding handle and the winding bore are such that the diameter of the intermediate shoulder is too large to pass the winding bore internal rib, although it will enter the winding bore. The frusto-conical boss will not pass the internal rib unless the legs are first urged together, thereby reducing the effective diameter of the frusto-conical boss. In assembly, the winding handle is inserted into the winding bore from the line side, the taper of the frusto-conical boss facilitating this insertion. When the frusto-conical boss encounters the internal rib, the taper on the shoulder urges the legs towards each other until the diameter of the frusto-conical boss is reduced sufficiently to allow it to pass the internal rib. When the frusto-conical boss has passed the internal rib, the legs resiliently spread apart, until the internal rib abuts the face of the frusto-conical boss which is adjacent to the circumferential groove and rests in said circumferential groove.

In the extended position, the hand-hold portion of the winding handle projects from the line side of the spool and may be used to rotate the spool upon the holding means. If the hand-hold portion is pushed towards the winding bore the internal rib acts upon the sloping wall of the circumferential groove, urging the legs towards each other and decreasing the effective diameter of the shaft portion until it can pass the internal rib. The winding handle can then be pushed further through the winding bore, until the intermediate shoulder abuts the internal rib. In this retracted position, the hand-hold portion of the winding handle is then contained within the winding bore and does not project beyond the line side of the spool, whilst the shaft has passed through the winding bore and projects from the holding side of the spool.

The winding handle is held in this retracted position by the action of the legs which resiliently move apart as they pass the internal rib, increasing the effective diameter of the shaft so that it cannot pass the internal rib in the opposite direction unless the legs are again moved together. To supplement the resilient action of the legs in holding the winding handle in the retracted position, a projection such as a circumferentially extending rib may be formed on the shaft portion of the winding handle adjacent the junction of the shaft and hand-hold portions. The projection increases the effective diameter of the shaft portion beyond that of the internal rib unless the legs are forced together to decrease this effective diameter and allow the projection to pass the internal rib.

The above procedure may be reversed to cause the winding handle to again project from the line side of the spool.

The preferred form of spool and holder shown in the drawings includes rim 1, line-side flange 2 and holder-side flange 3. Rim 1 is connected to hub 4 by web 5. Hub 4 is formed with axial bore 6 accomodating holding means 7.

Holding means 7 includes grip portion 8 and axle portion 9. The axle portion 9 has a frusto-conical boss 10, and a diametrical slot 11, and is separated from grip portion 8 by shoulder 12. In FIG. 2, holding means 7 is shown in its assembled position in the spool, with axle portion 9 within axial bore 6 and shoulder 12 abutting the tapering extension 13 of hub 4.

Retractable winding handle 14 includes a hand-hold portion 15 and a shaft portion 16. The hand-hold portion 15 is separated from the shaft portion 16 by an intermediate shoulder 17. Shaft portion 16 has a frusto-conical boss 18 with an adjacent circumferential groove 19, and is divided by diametrical slot 20. FIG. 2 shows retractable winding handle 14 in the extended position with shaft portion 16 in winding bore 21, and circumferential groove 19 engaging the circumferential internal rib 22 which is adjacent to boss 18.

FIG. 2 also shows (in broken line) the shaft portion 16 and boss 18 when the handle 14 is in its retracted position. In the retracted position, hand-hold portion 15 is retained substantially within winding bore 21 as intermediate shoulder 17 abuts the inner surface of internal rib 22. Projection 23 on shaft portion 16 adjacent to shoulder 17 can be forced past rib 22 by the inward flexure of resilient legs 24, 25 which constitute shaft portion 16. However after projection 23 has been forced past rib 22, the resilient legs 24, 25 flex apart and the abutment of projection 23 with rib 22 resists movement of winding handle 14 towards its extended position.

It will be appreciated that the spool and holder of this invention have various applications depending on the type of line with which they are used. For example, when used with fishing line, the spool and holder form a useful hand reel. Other types of line such as kite string or lines used in the building industry by surveyors, builders and bricklayers can also usefully be attached to the present spool and holder. Whatever end use is made of the spool and holder, the simple construction and convenient use in winding or releasing the attached line make the present invention superior to similar prior products.

What is claimed:

1. A spool and holder comprising:
    a spool having a line side and an opposite holder side and including a cylindrical rim, radially outwardly extending holder-side and line-side flanges at each side of the spool, and a hub connected to the rim and having an axial bore;
    a holding means including a grip portion and an axle portion, the axle portion extending into the axial bore so that the spool is rotatably mounted on the holding means;
    an integral stop means on the holding means located between the grip portion and the axle portion for preventing the holding means from passing through the axial bore beyond a position at which the stop means abuts the spool, wherein the holding means does not project axially substantially beyond the line-side flange;
    integral retention means on the axle portion and interacting with the axial bore for retaining the spool on the holding means; and
    a winding means including a winding bore extending through the spool parallel to the axial bore and situated between the axial bore and the radially outermost portion of either flange, and a winding handle removably insertable into the winding bore through the line side of the spool, the winding handle including a substantially cylindrical hand-hold portion of a diameter forming a close sliding fit within the winding bore and which merges through an intermediate shoulder with a shaft portion of slightly lesser diameter, whereby the winding handle is axially movable within the winding bore between an extended or winding position in which the hand-hold portion of the winding handle projects from the line side of the spool, and a retracted position in which the hand-hold portion is retained substantially within the winding bore.

2. A spool and holder as claimed in claim 1, wherein the holding means is of rod-like form and the diameter of the grip portion is greater than that of the axle portion whereby the stop means is a shoulder formed between these two portions of differing diameter.

3. A spool and holder as claimed in claim 2, wherein the axle portion includes a free end formed as a frusto-conical boss which tapers radially inwardly to the free end of the axle portion and forms a shoulder where it merges with the remainder of the axle portion, at least one diametrical slot passing from the free end of the boss at least part way into the axle portion thus defining a plurality of legs resiliently movable towards one another to enable the wider end of the boss to pass through the axial bore of the spool.

4. A spool and holder as claimed in claim 1, wherein the shaft portion of the winding handle includes a free end forming a frusto-conical boss which tapers radially inwardly to the free end of the shaft portion and forms a shoulder where it merges with the remainder of the shaft portion, at least one diametrical slot passing from the free end of the boss at least part way into the shaft portion thus defining a plurality of legs resiliently movable towards one another to enable the boss to pass through the winding bore.

5. A spool and holder as claimed in claim 4 wherein a circumferential groove surrounds the shaft portion adjacent the frusto-conical boss and receives, in the extended position of the winding handle, a complementary circumferential rib in the winding bore.

6. A spool and holder as claimed in claim 5 wherein a projection increasing the effective diameter of the shaft portion beyond that of the rib in the winding bore is formed on the shaft portion adjacent the junction of the shaft portion and hand hold portion.

* * * * *